Patented May 8, 1923.

1,454,599

UNITED STATES PATENT OFFICE.

JOHN COLLINS CLANCY, OF PROVIDENCE, RHODE ISLAND, ASSIGNOR TO THE NITROGEN CORPORATION, OF PROVIDENCE, RHODE ISLAND, A CORPORATION OF RHODE ISLAND.

PROCESS OF AMMONIA SYNTHESIS AND CATALYST THEREFOR.

No Drawing.    Application filed March 28, 1921. Serial No. 456,401.

*To all whom it may concern:*

Be it known that I, JOHN COLLINS CLANCY, a subject of the King of Great Britain, residing at Providence, in the county of Providence and State of Rhode Island, have invented certain new and useful Improvements in Processes of Ammonia Synthesis and Catalyst Therefor, of which the following is a specification.

This invention relates to an improved process of ammonia synthesis and catalyst for effecting the same, and is an improvement upon the invention described in my United States Patent 1,363,392 granted December 28, 1920.

One object of the invention is to provide an improved catalyst of the class described which is capable of being readily fixed upon a suitable distributive support to adhere firmly thereto, and may be easily regenerated when necessity arises whereby the effective life of the same may be greatly prolonged.

Another object of my invention concerns the improvement of the synthetic production of ammonia generally by the provision of an efficient catalyst, and one which is capable of being regenerated when its efficiency has become impaired, together with an improved method and means for effecting the regeneration.

Other objects and advantages of the invention relate to details of the composition employed as well as to novel combinations of steps in the method of forming the catalyst as will be more fully set forth in the detailed description to follow. In my Patent No. 1,363,392, referred to above, I have described a catalyst and the process of forming the same which results from depositing a film of a double cyanid of an alkali metal upon a porous support such as pumice stone, asbestos or the like, and treating the product thus formed to adapt the same for use as a catalyst in ammonia synthesis.

Among the cyanids referred to in the above patent as being capable of use in the formation of an efficient catalyst I have mentioned calcium ferrocyanid, barium ferrocyanid, potassium ferrocyanid and strontium ferrocyanid, together with the corresponding ferricyanids, as being particularly adapted for the purpose.

I have found that if, instead of using any one of the above mentioned cyanids alone, a mixture formed of two or more of the said salts is employed, various important advantages are obtained, such as the formation of a catalyst having a higher degree of efficiency in effecting the synthesis of ammonia from its elements, and the provision of a catalyst which may be regenerated when it has become fatigued by long continued use. While any of the double cyanids above mentioned may be advantageously employed in combination for the purpose of forming my improved catalyst, I prefer to use barium ferrocyanid and calcium ferrocyanid, it being understood that the following description of the process steps employed in the formation of my improved catalyst from barium ferrocyanid and calcium ferrocyanid may be followed generally in the formation of a catalyst from any combination of two or more of the cyanids mentioned.

Starting with substantially chemically pure calcium ferrocyanid and barium ferrocyanid, I first preferably dissolve the calcium ferrocyanid in water to form a concentrated solution, and then boil this solution with an excess of barium ferrocyanid. The degree of excess of barium ferrocyanid over calcium ferrocyanid may be varied somewhat or they may be employed in equal proportions if desired, but I preferably use 70 parts of calcium ferrocyanid to 30 parts of barium ferrocyanid as I find that the resultant substance adheres more firmly to the support.

While I preferably use pumice stone as a support for the catalyst by reason of the porosity of this material and the ease with which the catalytic material may be deposited thereon, other suitable porous materials may be employed as a distributive support provided however that they contain no substances liable to deleteriously affect the catalyst or interfere with the synthetic operation.

The pumice stone which I preferably employ as a support is first treated with hydrochloric acid to remove any traces of sulfur which may be present therein, and then thoroughly washed with water to remove the hydrochloric acid. The stone is then dried preparatory to receiving the cyanid mixture.

The coating of the stone forming the distributive support is then effected after the following manner: The requisite amount of pumice stone, in about one quarter inch cubes, is placed in the solution prepared by mixing the calcium ferrocyanid and barium ferrocyanid solutions, and the water of the solution evaporated off to leave a coating of the mixed cyanids upon the walls of the pores in the pumice, the evaporation preferably being effected at about 100° C. It is desirable that the stone and solution be agitated or stirred either prior to or during the evaporation of the water in order that all the interstices and surfaces of the stone may be uniformly coated with the mixed cyanids.

When the water has been entirely evaporated from the solution, the coated pumice is preferably transferred to a preparing autoclave although it may be placed directly in the synthesizing autoclave. During the treatment of the material in the autoclave air is carefully excluded, and I prefer to flow a dry mixture of nitrogen and hydrogen (or one or the other of these gases) through the coated pumice, to remove all traces of free oxygen therefrom. This preliminary treatment may be continued for several hours or until such time as all traces of oxygen or moisture are removed from the material, and is preferably effected at a temperature slightly in excess of 100° C.

After all traces of oxygen have been removed from the material I increase the temperature by steps to approximately 200° C., 300° C. and 350° C., subjecting the material to each of these heats for a period of approximately six hours. During the heating steps just described the flow of dry nitrogen-hydrogen gases through the autoclave is maintained but the rate of flow is comparatively rapid being about three cubic feet per minute, and the gases may be maintained at atmospheric pressure, but preferably when prepared in the working autoclave the gases are maintained under a pressure of approximately 300 pounds. Care must be observed in subjecting the material to heat in the manner above described, particularly as the higher temperatures are reached, that synthesis of the nitrogen and hydrogen gases does not take place, since, as the synthetic reaction is strongly exothermic the temperature may increase to such a point as to injure the catalyst.

In order to prevent the commencement of the synthesizing operation during the preliminary treatment of the catalyst it is advisable to maintain the gases under a low or substantially atmospheric pressure, as elevated pressures serve to activate the catalyst and accelerate the commencement of the synthesizing action.

After the material has been subjected to heat as above described for a sufficient time the temperature of the mass is reduced to room temperature and it may then be transferred to the working autoclave. The transfer should be accomplished with exclusion of air, and I preferably blow the catalytic mass from the preparing autoclave to the working autoclave by a jet of the working gases, that is, either dry nitrogen or dry hydrogen or a mixture of dry nitrogen and hydrogen.

When the material is in place in the contact chamber, or working autoclave, I preferably supply a mixture of dry nitrogen and hydrogen gases thereto, at the rate of approximately 300 cubic feet per hour and under a pressure of about 100 atmospheres, gradually elevating the temperature of the autoclave and the material contained therein to about 300° C. to activate the catalyst. During this operation the temperature of the mass is constantly observed and if it starts to run up unduly fast, the supply of nitrogen and hydrogen mixture passing therethrough is cut down, or the pressure reduced, or if necessary, both of these corrective measures are employed.

I continue to raise the temperature of the mass to a point preferably between 400° and 500° C. taking special precautions to carefully observe the rate of increase in temperature after passing 300° C. since as the temperature reaches the activating point for the catalyst, the synthesizing operation may commence accompanied by a rapid increase in temperature, which is undesirable at this point in the preparation of the catalyst and should be avoided by reducing the rate of flow of the gas or the pressure or both. At the elevated temperature maintained during this part of the preparatory treatment hydrocyanic gas is evolved, and I prefer to maintain the mass at a temperature of between 400° and 500° C. until the hydrocyanic gas ceases to be given off. If at any time the temperature of the mass rises unduly the pressure is reduced or the flow of gas cut down to prevent the maintenance of a temperature above 500° C. for any extended period. When the hydrocyanic gas is no longer given off the material is ready for use as a catalyst for ammonia synthesis and the pressure and rate of flow of the gases are gradually increased to effect the synthetic operation. As the synthesis of ammonia is begun the temperature may increase rapidly and this should be controlled by varying the pressure and the rate of flow of the gases to maintain the temperature at between 400° and 500° C. If provision is made for cooling the shell of the autoclave, temperature as high as 550°–600° C. may be employed.

Instead of a mixture of dry nitrogen and hydrogen gases, dry nitrogen gas or dry ammonia gas may be employed in the activating of the catalyst as above described.

The principal point to be emphasized, is the necessity for substantially preventing the automatic rise in temperature of the catalytic material during its preparation and the early stages of its use as a catalyst until it has become thoroughly stabilized.

The provision of a distributive support such as pumice is of great importance in effecting this control, since without the provision of such a carrier it becomes exceedingly difficult to prevent an excessive rise in temperature, especially in the inner portions of the catalytic body. I find that when a mixture of cyanids is employed the resulting catalyst is much more efficient giving a considerably higher yield of ammonia than is the case when any one of the double cyanids is used alone. Moreover, especially when an excess of barium ferrocyanid is used with one of the other double cyanids mentioned, the catalytic material adheres very firmly to the walls of the porous support which serves to promote the efficiency of the catalyst and prolong its life.

As previously stated my improved catalyst formed in the manner above described may be readily regenerated when it has become fatigued by long continued use to give the same an efficiency substantially equal to that which it originally possessed, thus extending many times the life of the catalyst, and making unnecessary the delays otherwise occasioned by removing the used catalyst from the operating autoclave and replacing it with new material, as well as obviating the expense incident to the frequent preparation of fresh catalytic material.

I have found that in synthesizing ammonia by means of catalysts, certain chemical reactions occur either ancillary to the synthetic operation or by reason of impurities present in the gases which affect the catalytic material and causes the same to become fatigued, with a resultant decrease in efficiency which eventually reaches a point where it becomes necessary to renew the catalytic material. Certain catalysts, such for example, as those formed from or including a cyanid or cyanamid of an alkalinous metal, and those formed from or containing a mixture of cyanids or cyanamids of alkalinous metals are capable of being regenerated when their initial efficiency has become impaired by reacting thereupon with dry ammonia gas, preferably under pressure and at an elevated temperature.

This regeneration may be effected by cutting off the flow of nitrogen-hydrogen gases, mixed in proper proportions for combining to form ammonia, and passing a current of anhydrous ammonia through the autoclave for a sufficient time to restore the catalyst to approximately its original efficiency; or the regeneration may be accomplished by returning the gases which have already passed through the synthesizing chamber, from which a portion only of the ammonia content has been removed, and combining these gases with the incoming nitrogen-hydrogen gases prior to passing the incoming gases through the autoclave. In the case last mentioned the ammonia vapor will be present in much smaller proportions than in the case where the nitrogen-hydrogen gases are cut off from the autoclave and anhydrous ammonia passed therethrough, but I find that even this smaller proportion of ammonia is capable of effecting the regeneration of the catalyst, and the presence of the small ammonia content in the nitrogen-hydrogen mixture interferes in no way with the synthesizing operation.

Just what chemical reactions occur in the catalyst during the synthesizing operation to cause the lowering of its efficiency, or in the process of regeneration of the same I am unable to state positively, but I have found (actually) that during the preliminary treatment for activating the catalyst a portion at least of the cyanid is changed into a cyanamid which is particularly efficient as a catalyst. Continued synthesis of ammonia by means of the catalyst and contact by oxygen or traces of moisture in the gases changes, I believe, a portion of the cyanamid to a carbonate, which, during the process of regeneration, is again converted to a cyanamid, with the consequence that the catalytic material regains approximately its initial efficiency as long as the synthesizing gases are dry. The regeneration of the catalyst is preferably accomplished under pressure and at an elevated temperature, the temperature and pressure employed being capable of variation, but preferably approximately the same as are employed in the synthesizing operation.

As I am aware of various modifications of and changes in my preferred catalyst and the process of preparing the same, I desire to be limited only by the scope of the appended claims broadly interpreted in the light of my disclosure.

Having thus described my invention, what I claim is:—

1. A catalyst adapted for the synthesis of ammonia from its elements, which comprises film-like formations of a product derived from a mixture of alkalinous metal iron cyanids deposited upon the walls of a porous support, the product thus formed having been heated in a nitrogen-hydrogen atmosphere at a sufficient temperature to activate the same.

2. A catalyst adapted for the synthesis of ammonia from its elements which comprises film-like formations of a product derived from a mixture of alkalinous metal iron cyanids deposited upon the walls of a porous support, the said product having been first thoroughly dried and then heated in a nitrogen-hydrogen atmosphere at a sufficient temperature to activate the same.

3. A catalyst adapted for the synthesis of ammonia from its elements which comprises film-like formations of a product derived from a mixture of calcium ferrocyanid and barium ferrocyanid deposited upon the walls of a porous support.

4. A catalyst adapted for the synthesis of ammonia from its elements which comprises film-like formations of a product derived from a mixture of calcium ferrocyanid and barium ferrocyanid deposited upon the walls of a porous support, the said product having been first thoroughly dried and then heated in a nitrogen-hydrogen atmosphere at a temperature to activate the same.

5. The process of preparing a catalyst adapted for the synthesis of ammonia from its elements, which comprises, coating the walls of a distributive support for said catalyst with a mixture of alkalinous metal iron cyanids, and reacting upon said cyanids to convert them into films of active catalytic material.

6. The process of preparing a catalyst adapted for the synthesis of ammonia from its elements which comprises, coating the walls of a distributive support for said catalyst with a mixture of alkalinous metal iron cyanids, thoroughly drying the product thus obtained, and then reacting upon the mass to convert the mixture of cyanids into active catalytic material.

7. The process of preparing a catalyst adapted for the synthesis of ammonia from its elements which comprises, coating the walls of a distributive support for said catalyst with a mixture of alkalinous metal iron cyanids, thoroughly drying the product thus obtained, and then heating the mass at a temperature sufficient to activate the catalytic material.

8. The process of preparing a catalyst adapted for the synthesis of ammonia from its elements which comprises, coating the walls of a distributive support for said catalyst with a solution of a mixture of alkalinous metal iron-cyanids, thoroughly drying the product thus obtained, and then heating the mass at a temperature sufficient to activate the catalytic material.

9. The process of preparing a catalyst adapted for the synthesis of ammonia from its elements which comprises, coating the walls of a distributive support for said catalyst with a mixture of calcium ferrocyanid and barium ferrocyanid, and heating the mass at a temperature sufficient to activate the catalytic material.

10. The process of preparing a catalyst adapted for the synthesis of ammonia from its elements which comprises, coating the walls of a distributive support for said catalyst with a mixture of calcium ferrocyanid and barium ferrocyanid, thoroughly drying the product thus obtained, and then heating the mass at a temperature sufficient to activate the catalytic material.

11. The process of preparing a catalyst adapted for the synthesis of ammonia from its elements which comprises, coating the walls of a distributive support for said catalyst with a mixture of calcium ferrocyanid and barium ferrocyanid in solution and evaporating off the water from the mixture of cyanids, thoroughly drying the product thus obtained, and then heating the mass at a temperature sufficient to activate the catalytic material.

12. The process of producing ammonia which comprises synthesizing said ammonia from its elements through the intermediacy of a catalyst which includes film-like formations of a product derived from a mixture of alkalinous metal iron cyanids deposited upon the walls of a porous support.

13. The process of producing ammonia which comprises synthesizing said ammonia from its elements through the intermediacy of a catalyst which includes a mixture of alkalinous metal iron cyanids deposited upon the walls of a porous support, and activated by the application of heat.

14. The process of producing ammonia which comprises synthesizing said ammonia from its elements through the intermediacy of a catalyst which includes film-like formations of a product derived from a mixture of calcium ferrocyanid and barium ferrocyanid deposited upon the walls of a porous support.

15. The process of producing ammonia which comprises synthesizing said ammonia from its elements through the intermediacy of a catalyst which includes a mixture of calcium ferrocyanid and barium ferrocyanid deposited upon the walls of a porous support and activated by heating in atmosphere containing nitrogen.

16. The process of producing ammonia which comprises synthesizing said ammonia from its elements through the intermediacy of a catalyst which includes a mixture of alkalinous metal cyanids which have been treated to effect their conversion into active catalytic material.

17. The process of producing ammonia which comprises synthesizing said ammonia from its elements through the intermediacy of a catalyst which includes a mixture of alkalinous metal iron cyanids which have been activated by the application of heat.

18. The process of preparing a catalyst adapted for the synthesis of ammonia from its elements which comprises, coating the walls of a distributive support for said catalyst with a mixture of alkalinous metal iron cyanids, thoroughly drying the product thus obtained, and then heating the mass under pressure and at a temperature sufficient to activate the catalytic material.

19. The process of preparing a catalyst adapted for the synthesis of ammonia from its elements which comprises, coating the walls of a distributive support for said catalyst with a solution of a mixture of alkalinous metal iron-cyanids, thoroughly drying the product thus obtained, and then heating the mass under pressure and at a temperature sufficient to activate the catalytic material.

20. A catalyst adapted for the synthesis of ammonia from its elements which comprises film-like formations of a product derived from a mixture of calcium ferrocyanid and barium ferrocyanid deposited upon the walls of a porous support, said product having been first thoroughly dried and then heated in an atmosphere containing nitrogen to activate the same.

21. A catalyst adapted for the synthesis of ammonia from its elements which comprises film-like formations of a product derived from a mixture of calcium ferrocyanid and barium ferrocyanid deposited upon the walls of a porous support, said product having been first thoroughly dried and then heated under pressure in an atmosphere containing nitrogen to activate the same.

22. A catalyst adapted for the synthesis of ammonia from its elements which comprises film-like formations of a product derived from a mixture of calcium ferrocyanid and barium ferrocyanid deposited upon the walls of a porous support, said product having been first thoroughly dried and then heated in an atmosphere containing dry ammonia gas to activate the same.

23. A catalyst adapted for the synthesis of ammonia from its elements which comprises film-like formations of a product derived from a mixture of calcium ferrocyanid and barium ferrocyanid deposited upon the walls of a porous support, said product having been first thoroughly dried and then heated under pressure in an atmosphere containing dry ammonia gas to activate the same.

24. The process of producing ammonia which comprises synthesizing said ammonia from its elements through the intermediacy of a catalyst which includes a mixture of calcium ferrocyanid and barium ferrocyanid deposited upon the walls of a porous support and activated by heating under pressure in an atmosphere containing nitrogen.

25. The process of producing ammonia which comprises synthesizing said ammonia from its elements through the intermediacy of a catalyst which includes a mixture of calcium ferrocyanid and barium ferrocyanid deposited upon a porous support and activated by heating in an atmosphere containing ammonia.

26. The process of producing ammonia which comprises synthesizing said ammonia from its elements through the intermediacy of a catalyst which includes a mixture of calcium ferrocyanid and barium ferrocyanid deposited upon the walls of a porous support and activated by heating under pressure in an atmosphere containing ammonia.

In testimony whereof I have affixed my signature.

JOHN COLLINS CLANCY.